US010975460B2

(12) United States Patent
Kawano

(10) Patent No.: US 10,975,460 B2
(45) Date of Patent: Apr. 13, 2021

(54) STEEL POWDER AND MOLD USING THE SAME

(71) Applicant: DAIDO STEEL CO., LTD., Nagoya (JP)

(72) Inventor: Masamichi Kawano, Nagoya (JP)

(73) Assignee: DAIDO STEEL CO., LTD., Nagoya (JP)

( * ) Notice: Subject to any disclaimer, the term of this patent is extended or adjusted under 35 U.S.C. 154(b) by 584 days.

(21) Appl. No.: 15/003,675

(22) Filed: Jan. 21, 2016

(65) Prior Publication Data

US 2016/0215375 A1  Jul. 28, 2016

(30) Foreign Application Priority Data

Jan. 28, 2015 (JP) ................................. 2015-014809
Aug. 18, 2015 (JP) ................................. 2015-161384

(51) Int. Cl.

| | | |
|---|---|---|
| *C22C 38/60* | (2006.01) | |
| *B22F 3/105* | (2006.01) | |
| *B22C 1/00* | (2006.01) | |
| *C22C 38/42* | (2006.01) | |
| *C22C 38/40* | (2006.01) | |
| *C22C 38/32* | (2006.01) | |
| *C22C 38/30* | (2006.01) | |
| *C22C 38/28* | (2006.01) | |
| *C22C 38/26* | (2006.01) | |
| *C22C 38/24* | (2006.01) | |
| *C22C 38/22* | (2006.01) | |
| *C22C 38/20* | (2006.01) | |
| *C22C 38/06* | (2006.01) | |
| *C22C 38/04* | (2006.01) | |
| *C22C 38/02* | (2006.01) | |
| *C22C 38/00* | (2006.01) | |
| *B33Y 70/00* | (2020.01) | |
| *B33Y 80/00* | (2015.01) | |
| *B22F 5/00* | (2006.01) | |
| *B22F 3/24* | (2006.01) | |
| *B33Y 40/00* | (2020.01) | |
| *C22C 33/02* | (2006.01) | |
| *B22D 17/22* | (2006.01) | |

(52) U.S. Cl.
CPC ................ *C22C 38/60* (2013.01); *B22C 1/00* (2013.01); *B22F 3/1055* (2013.01); *B22F 3/24* (2013.01); *B22F 5/007* (2013.01); *B33Y 40/00* (2014.12); *B33Y 70/00* (2014.12); *B33Y 80/00* (2014.12); *C22C 33/0257* (2013.01); *C22C 38/001* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/40* (2013.01); *C22C 38/42* (2013.01); *B22D 17/2209* (2013.01); *Y02P 10/25* (2015.11)

(58) Field of Classification Search
CPC ........ C22C 38/22; C22C 38/60; B22F 3/1055
USPC ......................................................... 75/255
See application file for complete search history.

(56) References Cited

U.S. PATENT DOCUMENTS

| | | |
|---|---|---|
| 6,365,096 B1 | 4/2002 | Sandberg et al. |
| 2004/0013559 A1 | 1/2004 | Sandberg et al. |
| 2007/0006949 A1 | 1/2007 | Sandberg et al. |
| 2009/0252640 A1 | 10/2009 | Sandberg et al. |
| 2011/0048583 A1 | 3/2011 | Montagnon et al. |
| 2011/0109016 A1 | 5/2011 | Fuwa et al. |

FOREIGN PATENT DOCUMENTS

| | | | | |
|---|---|---|---|---|
| CN | 101517116 A | 8/2009 | | |
| CN | 101921959 A | 12/2010 | | |
| EP | 2 194 155 A1 | 6/2010 | | |
| EP | 2 270 246 A1 | 1/2011 | | |
| EP | 2270246 A1 * | 1/2011 | ............ | C21D 6/002 |
| EP | 2 484 784 A1 | 8/2012 | | |
| EP | 2 551 367 A1 | 1/2013 | | |
| EP | 2 660 348 A1 | 11/2013 | | |
| JP | H06-256897 A | 9/1994 | | |
| JP | H08-269625 A | 10/1996 | | |
| JP | 2000-153325 A | 6/2000 | | |
| JP | 2000153325 A * | 6/2000 | | |
| JP | 2003-268486 A | 9/2003 | | |
| JP | 2007-297691 A | 11/2007 | | |
| JP | 2008-308745 A | 12/2008 | | |
| JP | 2009-279928 A | 12/2009 | | |
| JP | 2010-065280 A | 3/2010 | | |

(Continued)

OTHER PUBLICATIONS

European Office Action, dated May 29, 2018, in European Patent Application No. 16152652.0.

(Continued)

*Primary Examiner* — Weiping Zhu
(74) *Attorney, Agent, or Firm* — McGinn I. P. Law Group, PLLC.

(57) ABSTRACT

The present invention relates to a steel powder having a composition containing, in mass %, $0.10 \leq C < 0.25$, $0.005 \leq Si \leq 0.600$, $2.00 \leq Cr \leq 6.00$, $-0.0125 \times [Cr] + 0.125 \leq Mn \leq -0.100 \times [Cr] + 1.800$ in which the [Cr] represents the value of Cr content in mass %, $0.01 \leq Mo \leq 1.80$, $-0.00447 \times [Mo] + 0.010 \leq V \leq -0.1117 \times [Mo] + 0.901$ in which the [Mo] represents the value of Mo content in mass %, $0.0002 \leq N \leq 0.3000$, and the balance being Fe and unavoidable impurities.

8 Claims, No Drawings

(56) References Cited

FOREIGN PATENT DOCUMENTS

| JP | 2010-194720 A | 9/2010 |
|----|---------------|--------|
| JP | 2010-242147 A | 10/2010 |
| JP | 2014-105373 A | 6/2014 |
| JP | 2015-221933 A | 12/2015 |
| WO | WO 2011/149101 A1 | 12/2011 |
| WO | WO 2012/090562 A1 | 7/2012 |

OTHER PUBLICATIONS

Extended European Search Report dated Jul. 1, 2016.
European Office Action dated Oct. 23, 2017, in corresponding Patent Application No. 16152652.0.
European Patent Office Communication (Third Party Observations) pursuant to Rule 114(2) EPC dated May 4, 2018 in corresponding European Application No. 16152652.0.
Huang, et al. Application of Si in Tool and Die Steel, Advanced Materials Research; ISSN.
1662-8985, vol. 676, pp. 35-39 doi: 10.4028/www.scientific.net/AMR.676.35; 2013 Trans Tech Publications, Switzerland.
Communication pursuant to Rule 114(2) EPC dated Oct. 13, 2017 in European Application No. 16152652.0.
Selecka, M., Salac, A., "Mechanical Properties and Fracture with Metallic Inclusions of Sintered Hybrid Fe-Cr-Mo-V-xMn-0.24C Steel", Powder Metallurgy Progress vol. 10 (2010), No. 3, p. 133-145.
Chinese Office Action, dated Jun. 3, 2019, in Chinese Patent Application No. 201610060500.3 and English Translation thereof.
Japanese Office Action, dated May 14, 2019, in Japanese Application No. 2015-161384 and English Translation thereof.

\* cited by examiner

STEEL POWDER AND MOLD USING THE SAME

FIELD OF THE INVENTION

The present invention relates to a steel powder having excellent thermal conduction performance and corrosion resistance, and a mold produced by using the steel powder.

BACKGROUND ART OF THE INVENTION

In general, molds or dies such as injection molding mold used for molding a resin, a rubber and the like, die-cast die, hot press (also called hot stamp or die quench) die are manufactured by melting a steel to produce an ingot, then subjecting the ingot to forging and/or rolling to produce a block or a flat rectangular material, cutting it by means of machining to form a mold-shaped product, and then applying a heat treatment such as hardening or tempering to the mold-shaped product.

For those molds, cooling of the mold is generally conducted by providing a cooling circuit (water cooling line) in the inside thereof and flowing cooling water through the cooling circuit.

In such molds, increasing the efficiency of cooling with cooling water results in a reduction in cycle time, that is, fast-cycle production (molding) of products, and this leads to an improvement in production efficiency.

As a method for enhancing cooling efficiency, it is considered that a cooling circuit is formed in meanderingly and complicatedly in all directions in the inside of the mold, thereby enhancing cooling ability by an overall shape, layout and the like of the cooling circuit. However, it is technically impossible to form the cooling circuit in such a complicated form in a method for producing a mold by cutting by means of machining.

Under the above circumstances, attention is recently being focused on a technology for manufacturing a mold by additive manufacturing method (three-dimensional additive manufacturing).

The additive manufacturing method is a processing method for converting a three-dimensional model data into an actual object by accumulation of a material. In the additive manufacturing method, a shape expressed by three-dimensional computer aided design (CAD) data is first sliced along a plurality of planes perpendicular to a predetermined axis, and the sectional shapes of the resultant slices are calculated. The shapes of these slices are actually formed, and the formed slices are stacked and bonded together, thereby converting the computer-expressed shape into an actual object.

The additive manufacturing method includes the case of using a powder as a material and the case of using a plate as a material.

In the method in which a powder is used as a material, the powder is evenly spread into a layered form (each layer has a thickness of, e.g., several tens of micrometers), and certain regions of the powder layer are irradiated with thermal energy such as a laser beam or an electron beam, to melt/solidify or to sinter the powder layer. Layers are thus stacked one by one to thereby fabricate a whole shape.

On the other hand, in additive manufacturing in which plates are used as a material, individual parts (plates) resulting from the slicing of three-dimensional model data in a CAD are actually produced by machining, or the like, and these parts are stacked and bonded together by, for example, diffusion bonding, thereby fabricating a whole three-dimensional shape.

Examples of mold production by these additive manufacturing methods are disclosed, for example, in Patent Documents 1 and 2.

Specifically, Patent Document 1 discloses an invention relating to "a metal powder for selective laser sintering, a method for manufacturing a three-dimensional shaped object by using the same, and the three-dimensional shaped object obtained therefrom." Disclosed therein is a feature that a solidified layer is formed by irradiating a predetermined portion of a layer of a powdery material containing a precipitation-hardening metal composition with a light beam, thereby sintering or melting and solidifying the powder of the predetermined portion, another solidified layer is formed by newly forming a powder layer on the resulting solidified layer, and then irradiating another predetermined portion of the new powder layer with the light beam, and these steps are repeatedly performed to thereby produce a three-dimensional shaped object.

Patent document 2 discloses an invention relating to "a cavity insert for mold, a method for manufacturing an insert for mold, and a resin molding mold." Disclosed therein is a feature that a cavity insert having a spiral cooling passage inside is produced by processing a groove to be form the cooling passage in each of a plurality of metal plates based on slice data of the cavity insert, stacking the groove-processed metal plates in a prescribed order, diffusion-bonding the stacked metal plates, and shape-processing the metal block obtained.

The techniques of additive manufacturing methods described above are ones that fabricate a whole shape by stacking a material, and are capable of easily forming a complicated cooling circuit which runs meanderingly in all directions and which cannot be formed by machining at all. As a result, the cooling efficiency can be effectively rendered higher than that of molds produced by conventional machining, without disposing the cooling circuit unnecessarily close to the molding surface of the mold.

As described above, cooling ability has been enhanced by providing a meandering and complicated three-dimensional cooling circuit in the inside of a mold or the like. However, the cooling efficiency has already reached its limit, and further improvement of the cooling efficiency is difficult. As the cause of inhibiting the improvement of cooling efficiency, there are the problems of (1) low thermal conductivity, (2) promotion of cracking of a water-cooling hole and (3) low corrosion resistance. As another problem apart from the cooling efficiency in a mold, there is a problem of (4) frequent occurrence of heat check. The problems (1) to (4) are described below.

The problem of (1) low thermal conductivity is first described below. In general, in additive manufacturing method is used powder of 18Ni maraging steel or SUS420J2-type steel, but those steels have low thermal conductivity. Therefore, even though a cooling circuit is efficiently provided, heat transfer in a mold (between a design surface and a cooling circuit) is not fast, and there is a limit in the improvement of cooling efficiency.

The problem of (2) promotion of cracking of a water-cooling hole is described. In order to increase cooling efficiency, a cooling circuit may be provided close to a design surface. However, if the cooling circuit is provided excessively close to the design surface, cracks from the cooling circuit become easy to develop on the design surface due to superposition of the increase of stress and the decrease of penetration distance. Therefore, there is a limit in the closeness of the cooling circuit to the design surface, and therefore, there is a limit in the improvement of cooling efficiency. Furthermore, 18Ni maraging steel and SUS420J2-type steel have low thermal conductivity, and therefore, temperature gradient in a mold becomes large. As a result, thermal stress of an inner surface of a cooling circuit is increased, and cracking of a water-cooling hole constituting the cooling circuit becomes easy to occur. In this sense, too, a material having low thermal conductivity makes it difficult to provide a cooling circuit close to a design surface, and becomes bottleneck in the improvement of cooling efficiency.

The problem of (3) low corrosion resistance is described. Since 18Ni maraging steel has low corrosion resistance, a water-cooling hole rusts easily. Rust which is an oxide has very low thermal conductivity, therefore becomes a barrier of heat exchanging between cooling water and a mold, and inhibits the improvement of cooling efficiency. When rust becomes remarkable, a cooling circuit becomes narrow by the rust, and a flow volume of a coolant is decreased, thereby decreasing cooling efficiency. In a sever case, a cooling circuit sometimes clogs by rust, and in such a case, a curved cooling circuit becomes meaningless.

Finally, the problem of (4) frequent occurrence of heat check is described. Since 18 Ni maraging steel and SUS420J2-type steel have low thermal conductivity, temperature gradient in a mold becomes large. As a result, thermal stress of a design surface is increased and heat check becomes easy to occur. If high-temperature strength is low, the problem of heat check is further emerged.

Summarizing the above, the problems of a mold or parts having a three-dimensional cooling circuit boil down to low thermal conductivity and low corrosion resistance. Because of low thermal conductivity, there is a limit in the improvement of cooling efficiency, and in addition, cracking of a water-cooling hole is promoted and heat check frequently occurs. Furthermore, because of low corrosion resistance, cooling efficiency is decreased (in the worst case, a water-cooling hole clogs) due to rust, and this makes further difficult to improve cooling efficiency.

In other words, if a mold or parts are manufactured by means of additive manufacturing method using a steel powder attaining both high thermal conductivity and high corrosion resistance, the above problems will be solved.

However, regardless of manufacturing a mold by an additive manufacturing method, steels conventionally used for a mold, such as JIS SKD61-type steel, SUS420J2-type steel and a maraging steel contain large amounts of elements such as Si, Cr, Ni, and Co that have high-temperature strength but are easy to solid-dissolve in a matrix. Therefore, such the steel has low thermal conductivity, and it is difficult to enhance cooling efficiency from the standpoint of thermal conductivity.

That is, heretofore, there has been provided no steel for a mold, which can achieve sufficient performance in corrosion resistance and thermal conductivity performance in addition to high-temperature strength in the case where a mold is formed from the steel.

As a further prior art of the present invention, Patent Document 3 discloses an invention relating to "a tool steel for hot working". Specifically, Patent Document 3 discloses a tool steel for hot working containing C: 0.28% to 0.55%, Si: 0.15% to 0.80%, Mn: 0.40% to 0.85%, P: 0.020% or less, S: 0.018% or less, Cr: 2.5% to 5.7%, Mo: 1.4% to 2.8%, V: 0.20% to 0.90%, W: 0.01% to 1.65%, Co: 0.03% to 0.89% and Ni: 0.01% to 1.65%, with the balance being substantially Fe and unavoidable impurities, in which N as the unavoidable impurities is restricted to 0.009% or less, Ti is restricted to 0.003% or less, and B is restricted to 0.012% or less, the cleanness of non-metallic inclusions is JIS dA 0.005% or less and d(B+C) 0.020% or less, and the orientation of martensite structure after heat treatment is a range of from 17% to 33%.

As another prior art of the present invention, Patent Document 4 discloses an invention relating to "a steel for a crushing blade and a method for producing a crushing blade." Specifically, Patent Document 4 discloses a steel for a crushing blade containing C: 0.3% to 0.5%, Si: 0.2% to 0.5%, Mn: 0.1% to 1.0%, Cr: 4.0% to 6.0%, one or two of Mo and W as Mo+1/2W: 0.8% to 2.5%, and one or two of V and Nb as V+1/2Nb: 0.3% to 1.0% as basic components, with the balance being Fe and unavoidable impurities.

As further another prior art of the present invention, Patent Document 5 discloses an invention relating to "a hot forging mold and a manufacturing method thereof. Specifically, Patent Document 5 discloses a hot forging mold containing C: 0.32% to 0.42%, Si: 0.3% or less, Mn: 0.3% to 1.5%, Ni: 0.5% or less, Cr: 4.0% to 6.0%, V: 0.2% to 1.0%, Mo+1/2W: 0.8% to 2.0%, and N: 0.005% to 0.04%, with the balance being Fe and unavoidable impurities.

As further another prior art of the present invention, Patent Document 6 discloses an invention relating to "a mold for hot working". Specifically, Patent Document 6 discloses a mold for hot working having a chemical composition containing C: 0.30% or more and less than 0.50%, Si: 0.10% to 0.5%, Mn: 0.30% to 1.0%, P: 0.02% or less, S: 0.005% or less, Cr: 4.0% to 8.0%, Mo: 0.2% or more and less than 1.5%, V: 0.05% to 1.0%, Al: 0.03% or less, N: 0.0150% or less, and O: 0.0030% or less, and the balance being Fe and impurities, in which Ni and W as the impurities each are less than 0.7%, and having tensile strength of 900 MPa or more, and in which the mold for hot working has a nitrided layer having a hardened depth exceeding 200 μm provided on at least the surface contacting a material to be worked, and the nitrided layer has a hardness of 900 or less in terms of Vickers hardness at a position of a depth of 30 μm or more.

As further another prior art of the present invention, Patent Document 7 discloses an invention relating to "a steel for a hot forging die". Specifically, Patent Document 7 discloses a steel for a hot forging die containing C: 0.25% to 0.45%, Si: 0.50% or less, Mn: 0.2% to 1.0%, P: 0.015% or less, S: 0.005% or less, Ni: 0.5% to 2.0%, Cr: 2.8% to 4.2%, Mo: 1.0% to 2.0%, V: 0.1% to 0.5%, with the balance being Fe and unavoidable impurities.

As further another prior art of the present invention, Patent Document 8 discloses an invention relating to "a tool steel for hot working". Specifically, Patent Document 8 discloses a tool steel for hot working, which is an alloy steel containing C: 0.25% to 0.40%, Si: 0.50% or less, Mn: 0.30% to 1.00%, P: 0.015% or less, S: 0.005% or less, Ni: 0.50% to 2.00%, Cr: 2.70% to 5.50%, Mo: 1.00% to 2.00%, V: 0.40% to 0.80%, B: 0.0005% to 0.0100%, Al: 0.015% to 0.10%, and N: 0.015% or less, with the balance being Fe and unavoidable impurities, in which the alloy steel has a fracture toughness value (KQ) of 250 Kgf/mm$^{3/2}$ or more at room temperature, and proof stress (0.2% PS) of 60 Kgf/mm$^2$ or more at a high temperature (600° C.).

However, the steels disclosed in Patent Documents 3 to 8 are that C content is 0.25% or more, and are therefore different from the steel of the present invention in the C content. Additionally, those patent documents do not refer to the embodiment that the steel is used as a material of an additive manufacturing method in the form of a powder.

Patent Document 1: WO2011/149101
Patent Document 2: JP-A-2010-194720
Patent Document 3: JP-A-2003-268486
Patent Document 4: JP-A-2007-297691
Patent Document 5: JP-A-2008-308745
Patent Document 6: JP-A-2010-65280
Patent Document 7: JP-A-H06-256897
Patent Document 8: JP-A-H08-269625

SUMMARY OF THE INVENTION

The present invention has been made in view of the above circumstances, and an object thereof is to provide a steel powder that can attain high thermal conductivity and high corrosion resistance for producing a mold by applying an additive manufacturing method, and to provide a mold manufactured by using the steel powder.

The steel powder according to the present invention is a steel powder having a composition containing, in mass %:

$0.10 \leq C < 0.25$, $0.005 \leq Si \leq 0.600$, $2.00 \leq Cr \leq 6.00$, $-0.0125 \times [Cr] + 0.125 \leq Mn \leq -0.100 \times [Cr] + 1.800$     (1)

in which the [Cr] represents the value of Cr content in mass %, $0.01 \leq Mo \leq 1.80$, $-0.00447 \times [Mo] + 0.010 \leq V \leq -0.1117 \times [Mo] + 0.901$     (2)

in which the [Mo] represents the value of Mo content in mass %, $0.0002 \leq N \leq 0.3000$, and the balance being Fe and unavoidable impurities.

The steel powder of the present invention may further contain, in mass %:

$0.10 < Al \leq 1.20$.

The steel powder of the present invention may further contain, in mass %, at least either one of the following:

$0.30 < Ni \leq 3.50$ and $0.30 < Cu \leq 2.00$.

The steel powder of the present invention may further contain, in mass %:

$0.0001 < B \leq 0.0100$.

The steel powder of the present invention may further contain, in mass %, at least either one of the following:

$0.003 < S \leq 0.250$, $0.0005 < Ca \leq 0.2000$, $0.03 < Se \leq 0.50$, $0.005 < Te \leq 0.100$, $0.01 < Bi \leq 0.50$, and $0.03 < Pb \leq 0.50$.

The steel powder of the present invention may further contain, in mass %, at least either one of the following:

$0.004 < Nb \leq 0.100$, $0.004 < Ta \leq 0.100$, $0.004 < Ti \leq 0.100$, and $0.004 < Zr \leq 0.100$.

The steel powder of the present invention may further contain, in mass %, at least either one of the following:

$0.10 < W \leq 5.00$ and $0.10 < Co \leq 3.00$.

The mold according to the present invention is a mold containing a site produced by an additive manufacturing method using any of the steel powders described above.

In the present invention, the term "mold" encompasses a mold and a die and includes a mold (or die) body and mold (or die) parts such as a spool core, which are assembled to the mold (or die) body. Furthermore, the term "mold" includes the surface-treated mold (or die) made of the steel of the present invention.

The present invention has been accomplished under the circumstance that any steel powder having both characteristics of high thermal conductivity and high corrosion resistance was not conventionally provided. The present invention can attain high thermal conductivity while maintaining high corrosion resistance, by reducing the content of alloy components that decrease thermal conductivity with respect to high-alloy steels such as a maraging steel and a stainless steel, adjusting Cr content to $2.00 \leq Cr \leq 6.00$ without excessively decreasing Cr since corrosion resistance is deteriorated if Cr is excessively decreased, and balancing those alloy components appropriately.

The steel powder according to the present invention is preferably used as a powder material that is used in manufacturing a mold by shaping by means of an additive manufacturing method.

In an additive manufacturing method using a powder, when a thermal energy is applied to a layer of a spread powder to consolidate the powder, the powder is melted and coagulated or sintered.

At that time, the powder is quenched from a high temperature state such as a molten state, and hardening is automatically conducted. The hardening in this case is rapidly conducted in a high cooling rate. That is, the hardening is simultaneously performed sequentially in a layered molding step.

Thus, the hardening is performed in a high cooling rate. Therefore, even though the content of a component for improving hardenability is previously suppressed in small amount as a steel component, the hardening is well performed during additive manufacturing. According to the present invention, it is possible to achieve a hardness of from 30 to 50 HRC necessary for a mold by merely additive manufacturing.

In the case where the steel powder according to the present invention as described above is applied to a die-cast die or parts thereof by an additive manufacturing method, the improvement of cooling efficiency, the suppression of heat check and the inhibition of cracking of a water-cooling hole can be attained.

Furthermore, even in the case where the steel powder according to the present invention is applied to a mold or parts, which are used in injection molding of a resin, a rubber and the like, forging, or hot press of a steel plate, the steel powder can exhibit high performance.

It is not necessary to manufacture the whole of the mold or part by additive manufacturing. For example, a member produced by an ordinary production method (e.g., machining from a melt-formed material) is used as a base, and only a site containing a curved three-dimensional cooling circuit may be produced by an additive manufacturing method using the steel powder of the present invention.

DETAILED DESCRIPTION OF THE INVENTION

Hereinafter, the composition of the steel powder according to the present invention will be described in detail. The steel powder according to the present invention has a composition containing C, Si, Cr, Mn, Mo, V, N as essential elements and the balance is formed of Fe and unavoidable impurities.

The reason for limiting each chemical component in the steel powder of the present invention is described below. The value of each chemical component is mass % basis.

$0.10 \leq C < 0.25$

In the case where the C content is less than 0.10, hardness of 30 HRC or more, required for a mold, is not obtained when tempering is performed after additive manufacturing. On the other hand, where the C content is 0.25 or more, thermal conductivity is deteriorated. Additionally, in the case where the C content is 0.25 or more, the hardness of a mold after additive manufacturing exceeds 50 HRC, and when the mold after additive manufacturing is used as it is, a risk of large cracking of the mold is increased. The C content is in a range of preferably $0.11 \leq C < 0.24$, and more preferably $0.12 \leq C < 0.23$, from the standpoint of excellent balance of various characteristics.

$0.005 \leq Si \leq 0.600$

In the case where the Si content is less than 0.005, machinability is remarkably deteriorated. On the other hand, in the case where the Si content is more than 0.600, thermal conductivity is remarkably deteriorated. The Si content is in a range of preferably $0.010 \leq Si \leq 0.550$, and more preferably $0.020 \leq Si \leq 0.200$, from the standpoint of excellent balance of various characteristics.

$2.00 \leq Cr \leq 6.00$

In the case where the Cr content is less than 2.00, corrosion resistance is not sufficient, resulting in rust and cracking of a water cooling circuit. Additionally, in the case where the Cr content is less than 2.00, martensite transformation point becomes high, and metallographic structure is coarsened, thereby lacking in hardness and toughness. On the other hand, in the case where the Cr content is more than 6.00, thermal conductivity is deteriorated. The Cr content is in a range of preferably $2.05 \leq Cr \leq 5.90$, and more preferably $2.10 \leq Cr \leq 5.70$, from the standpoint of excellent balance of various characteristics.

$$-0.0125 \times [Cr] + 0.125 \leq Mn \leq -0.100 \times [Cr] + 1.800 \quad (1)$$

In the formula, the [Cr] represents the value of Cr content in mass %. In the case where the Mn content is less than $-0.0125 \times [Cr] + 0.125$, a transformation point becomes high, and metallographic structure is coarsened, thereby lacking in hardness and toughness. On the other hand, in the case where the Mn content is more than $-0.100 \times [Cr] + 1.800$, thermal conductivity is deteriorated.

The tendency that metallographic structure is coarsened, thereby lacking in hardness and toughness is particularly remarkable in the case where the Cr content is low. Additionally, the deterioration of thermal conductivity is particularly remarkable in the case where the Cr content is high.

$0.01 \leq Mo \leq 1.80$

In the case where the Mo content is less than 0.01, high-temperature strength is insufficient. Additionally, in the case where the Mo content is less than 0.01, it becomes difficult to secure hardness of 30 HRC or more when a heat treatment at a temperature of Ac1 point or lower is conducted after additive manufacturing. On the other hand, in the case where the Mo content is larger than 1.80, the decrease of a fracture toughness value is large. The Mo content is in a range of preferably $0.05 \leq Mo \leq 1.70$, and more preferably $0.10 \leq Mo \leq 1.60$.

$$-0.00447 \times [Mo] + 0.010 \leq V \leq -0.1117 \times [Mo] + 0.901 \quad (2)$$

In the formula, the [Mo] represents the value of Mo content in mass %. In the case where the V content is less than $-0.00447 \times [Mo] + 0.010$, high-temperature strength is insufficient. Further, it becomes difficult to secure hardness of 30 HRC or more when a heat treatment at a temperature of Ac1 point or lower is conducted after additive manufacturing. Additionally, in the case where the V content is less than $-0.00447 \times [Mo] + 0.010$, crystal grains are coarsened, thereby decreasing toughness, when a hardening of heating at a temperature of Ac3 point or higher is conducted after additive manufacturing. On the other hand, in the case where the V content is more than $-0.1117 \times [Mo] + 0.901$, the above effects tend to be saturated, and additionally, the content incurs remarkable increase of cost.

$0.0002 \leq N \leq 0.3000$

In the case where the N content is less than 0.0002, it becomes difficult to secure hardness of 30 HRC or more. Furthermore, in the case where the N content is less than 0.0002, the effect of improving corrosion resistance is poor. Additionally, in the case where the N content is less than 0.0002, crystal grains are coarsened when hardening is conducted after additive manufacturing. On the other hand, in the case where the N content is more than 0.3000, the effects of increasing strength and improving corrosion resistance tend to be saturated, and additionally, refining cost is remarkably increased. Furthermore, in the case where the N content is more than 0.3000, nitrogen frequently escapes from a molten part during additive manufacturing. In such a case, holes are formed in an additive manufacturing part, and characteristics such as toughness are not satisfied. The N content is in a range of preferably $0.0003 \leq N \leq 0.2500$, and more preferably $0.0004 \leq N \leq 0.2000$.

The steel powder of the present invention generally contains the following components as unavoidable impurities in the following amounts.

$0 \leq P \leq 0.05$ $0 \leq S \leq 0.003$ $0 \leq Cu \leq 0.30$ $0 \leq Ni \leq 0.30$ $0 \leq Al \leq 0.10$ $0 \leq W \leq 0.10$ $0 \leq O \leq 0.05$ $0 \leq Co \leq 0.10$ $0 \leq Nb \leq 0.004$ $0 \leq Ta \leq 0.004$ $0 \leq Ti \leq 0.004$ $0 \leq Zr \leq 0.004$ $0 \leq B \leq 0.0001$ $0 \leq Ca \leq 0.0005$ $0 \leq Se \leq 0.03$ $0 \leq Te \leq 0.005$ $0 \leq Bi \leq 0.01$ $0 \leq Pb \leq 0.03$ $0 \leq Mg \leq 0.02$ $0 \leq REM$ (Rare Earth Metal) $\leq 0.10$ The steel powder according to the present invention may optionally contain one or more kinds of elements selected from the elements described below in addition to the above-described essential elements. That is, the steel powder according to the present invention may consist only of, in mass %:

$0.10 \leq C < 0.25$, $0.005 \leq Si \leq 0.600$, $2.00 \leq Cr \leq 6.00$, $-0.0125 \times [Cr] + 0.125 \leq Mn \leq -0.100 \times [Cr] + 1.800$ (1)

$0.01 \leq Mo \leq 1.80$, $-0.00447 \times [Mo] + 0.010 \leq V \leq -0.1117 \times [Mo] + 0.901$ (2)

$0.0002 \leq N \leq 0.3000$, and the balance being Fe and unavoidable impurities, but it may optionally contain one or more kinds of elements selected from the elements with its contents as described below.

Al:

The steel according to the present invention may be subjected to hardening after additive manufacturing. To suppress coarsening of austenite crystals during hardening, Al can be contained in an amount of $0.10 < Al \leq 1.20$.

Al bonds to N to form MN, and produces the effect of suppressing the movement of austenite crystal grain boundaries (i.e., growth of the grains).

Further, Al forms the nitride in a steel to contribute to precipitation strengthening, and therefore has a function of increasing surface hardness of a nitrided steel material. For a mold (including parts constituting parts of a mold) to be subjected to nitridation treatment in order to achieve higher surface hardness, it is effective to use a steel material containing Al.

Ni and Cu:

The steel according to the present invention may be subjected to hardening after additive manufacturing. If hardenability is poor, ferrite, pearlite or coarse bentonite precipitates during hardening, and various characteristics are deteriorated. To deal with the disadvantage, Cu and/or Ni may be selectively added to enhance hardenability. Specifically, at least either one of $0.30 < Ni \leq 3.50$ and $0.30 < Cu \leq 2.00$ may be contained in the steel.

Regardless of whether conducting hardening, in the case where a heat treatment to a temperature of Ac1 point or lower is conducted, Ni bonds to Al to precipitate an intermetallic compound and has the effect of increasing hardness. Also Cu has the effect of increasing hardness by age precipitation in the case where a heat treatment to a temperature of Ac1 point or lower is conducted. The Ni content and Cu content are preferably in ranges of $0.50 \leq Ni \leq 3.00$ and $0.50 \leq Cu \leq 1.80$, respectively. Each element exceeding a predetermined amount deteriorates thermal conduction property and toughness.

B:

Addition of B is also effective as an improvement measure of hardenability. Specifically, B may be contained in an amount of $0.0001 < B \leq 0.0100$.

When B forms BN, the effect of improving hardenability is lost. Therefore, B must be present alone in a steel. Specifically, a nitride is formed by an element having a stronger affinity for N than B, thereby preventing B from bonding to N. Examples of such the element include Nb, Ta, Ti and Zr. Those elements have the effect of fixing N even through those elements are present in an impurity level, but there is a case that those elements are added in amounts described below, depending on the amount of N. Even though B bonds to N in a steel to form BN, if excessive B is present alone in a steel, this enhances hardenability. B is also effective to the improvement of machinability and grindability. A mold and parts made of the steel of the present invention may be subjected to cutting and grinding after additive manufacturing. In the case of improving machinability and grindability, BN is made to be formed. BN has properties similar to those of graphite, and decreases resistance of cutting and grinding, and additionally improves chip breakability.

In the case where B and BN are present in a steel, hardenability as well as machinability and grindability are simultaneously improved.

S, Ca, Se, Te, Bi and Pb:

The steel of the present invention has a small amount of the Si, and therefore, has a slightly poor mechanical workability. As an improvement measure of workability, the following S, Ca, Se, Te, Bi and Pb may be selectively added. Specifically, at least either one of $0.003 < S \leq 0.250$, $0.0005 < Ca \leq 0.2000$, $0.03 < Se \leq 0.50$, $0.005 < Te \leq 0.100$, $0.01 < Bi \leq 0.50$ and $0.03 < Pb \leq 0.50$ may be contained in the steel.

In the case where the amount of any one of those elements exceeds a predetermined amount, it incurs the decrease of an impact value.

Nb, Ta, Ti, and Zr:

In the case where hardening is performed after additive manufacturing, if heating temperature for hardening is increased or heating time for hardening is prolonged due to unexpected facility troubles or the like, deterioration of various characteristics caused by coarsening of crystal grains is concerned. To provide for the case, Nb, Ta, Ti and Zr may be selectively added, and coarsening of austenite crystal grains can be suppressed by fine precipitates formed by those elements. Specifically, at least one either of $0.004 < Nb \leq 0.100$, $0.004 < Ta \leq 0.100$, $0.004 < Ti \leq 0.100$, and $0.004 < Zr \leq 0.100$ may be contained in the steel. Where the amount of any one of those element exceeds a predetermined amount, carbides, nitrides and oxides are excessively formed, incurring decrease of an impact value.

W and Co:

In order to increase strength of the steel of the present invention, which has low C of C<0.25 as a steel for a mold, W and Co may be selectively added.

W increases strength by fine precipitation of carbides. Co increases strength by solid solution into a matrix, and simultaneously contributes to precipitation hardening through the change of carbide form. Specifically, at least either one of 0.10<W≤5.00 and 0.10<Co≤3.00 may be contained in the steel.

In the case where the amount of any one of those elements exceeds the predetermined amount, it incurs saturation of characteristics and increase of cost. In the case where Co exceeds the predetermined amount, it decreases thermal conductivity. The amounts of W and Co are preferably 0.30≤W≤4.50 and 0.30≤Co≤2.50, respectively.

According to the present invention described above, a steel powder that can attain high thermal conductivity and high corrosion resistance in producing a mold by applying an additive manufacturing method, and a mold produced by using the steel powder can be provided.

EXAMPLES

Molds and test pieces were produced by using 34 kinds of steel powders shown in Table 1 by an additive manufacturing method, and various tests were conducted. Specifically, tests for evaluating hardness, thermal conductivity, mold surface temperature, heat check, and cracking of a water-cooled hole were conducted.

Some steel powders shown in Tablet contain elements not shown in the Table within ranges of amounts specified as impurities.

In Table 1, Comparative Steel 1 is JIS SKD61-type steel, Comparative Steel 2 is 18Ni maraging steel, Comparative Steel 3 is martensite stainless steel SUS 420J2, and Comparative Steel 4 is steel SCM435 for machine structural use. Each of the comparative steels is that amounts of at least two elements are outside the ranges specified in the present invention.

Those 34 kinds of steel powders were produced by a gas atomizing method. The obtained powder has a shape close to a sphere, and in the case of adopting the histogram of its diameter, the powder having a diameter of 100 μm or less occupies 80% or more of the whole (flaky or gourd-shaped powder is present in small amount).

The preferred powder for additive manufacturing is a fine powder in which an average value of a diameter is 400 μm or less, and in the case of adopting the histogram of the diameter, 80% or more of the whole powders has a diameter of 400 μm or less.

TABLE 1

| | | Chemical composition (mass %) | | | | | | | Mn Formula (1) left side | Mn Formula (1) right side | (Balance: Fe) V Formula (2) left side | (Balance: Fe) V Formula (2) right side |
|---|---|---|---|---|---|---|---|---|---|---|---|---|
| | | C | Si | Mn | Cr | Mo | V | N | Others | | | | |
| Invention Steel | 1 | 0.19 | 0.293 | 0.45 | 5.29 | 1.18 | 0.401 | 0.0092 | | 0.059 | 1.271 | 0.005 | 0.769 |
| | 2 | 0.21 | 0.089 | 0.46 | 5.26 | 1.17 | 0.390 | 0.0051 | | 0.059 | 1.274 | 0.005 | 0.770 |
| | 3 | 0.19 | 0.490 | 0.70 | 5.52 | 1.21 | 0.585 | 0.0151 | | 0.056 | 1.248 | 0.005 | 0.766 |
| | 4 | 0.22 | 0.120 | 0.71 | 5.53 | 1.25 | 0.553 | 0.0187 | | 0.056 | 1.247 | 0.004 | 0.761 |
| | 5 | 0.15 | 0.068 | 0.83 | 2.11 | 1.58 | 0.004 | 0.0028 | | 0.099 | 1.589 | 0.003 | 0.725 |
| | 6 | 0.16 | 0.092 | 0.07 | 5.59 | 0.11 | 0.876 | 0.0006 | | 0.055 | 1.241 | 0.010 | 0.889 |
| | 7 | 0.13 | 0.020 | 0.91 | 3.09 | 0.17 | 0.550 | 0.0211 | 0.21Al | 0.086 | 1.491 | 0.009 | 0.882 |
| | 8 | 0.14 | 0.044 | 1.16 | 2.39 | 0.23 | 0.471 | 0.0198 | 0.42Al, 1.27Ni | 0.095 | 1.561 | 0.009 | 0.875 |
| | 9 | 0.11 | 0.116 | 0.56 | 4.07 | 1.25 | 0.087 | 0.0401 | 0.97Al, 3.12Ni, 1.02Cu | 0.074 | 1.393 | 0.004 | 0.761 |
| | 10 | 0.12 | 0.188 | 1.06 | 2.67 | 0.35 | 0.256 | 0.0086 | 0.023S | 0.092 | 1.533 | 0.008 | 0.862 |
| | 11 | 0.17 | 0.197 | 1.01 | 2.81 | 0.41 | 0.145 | 0.0013 | 0.04Nb | 0.090 | 1.519 | 0.008 | 0.855 |
| | 12 | 0.22 | 0.140 | 0.96 | 2.95 | 0.47 | 0.833 | 0.0135 | 4.33W | 0.088 | 1.505 | 0.008 | 0.849 |
| | 13 | 0.19 | 0.164 | 1.11 | 2.53 | 0.53 | 0.785 | 0.1073 | 1.94W, 1.96Co | 0.093 | 1.547 | 0.008 | 0.842 |
| | 14 | 0.20 | 0.080 | 0.86 | 3.23 | 0.59 | 0.731 | 0.0192 | 0.0040B | 0.085 | 1.477 | 0.007 | 0.835 |
| | 15 | 0.21 | 0.104 | 0.81 | 3.37 | 0.06 | 0.881 | 0.0203 | 0.51Cu | 0.083 | 1.463 | 0.010 | 0.894 |
| | 16 | 0.18 | 0.006 | 0.26 | 4.91 | 1.31 | 0.053 | 0.0596 | 0.021Ti | 0.064 | 1.309 | 0.004 | 0.755 |
| | 17 | 0.23 | 0.549 | 0.72 | 3.65 | 1.37 | 0.030 | 0.0348 | 0.16Pb | 0.079 | 1.435 | 0.004 | 0.748 |
| | 18 | 0.12 | 0.010 | 0.66 | 3.79 | 0.83 | 0.449 | 0.0175 | | 0.078 | 1.421 | 0.006 | 0.808 |
| | 19 | 0.17 | 0.430 | 0.61 | 3.93 | 0.89 | 0.384 | 0.0302 | | 0.076 | 1.407 | 0.006 | 0.802 |
| | 20 | 0.19 | 0.519 | 0.08 | 5.47 | 1.13 | 0.185 | 0.0810 | | 0.057 | 1.253 | 0.005 | 0.775 |
| | 21 | 0.20 | 0.488 | 0.51 | 4.21 | 1.01 | 0.289 | 0.0113 | | 0.072 | 1.379 | 0.005 | 0.788 |
| | 22 | 0.14 | 0.459 | 0.47 | 4.35 | 1.07 | 0.234 | 0.0241 | | 0.071 | 1.365 | 0.005 | 0.781 |
| | 23 | 0.11 | 0.309 | 0.76 | 3.51 | 0.95 | 0.337 | 0.0136 | | 0.081 | 1.449 | 0.006 | 0.795 |
| | 24 | 0.21 | 0.399 | 0.36 | 4.63 | 1.19 | 0.136 | 0.0044 | | 0.067 | 1.337 | 0.005 | 0.768 |
| | 25 | 0.18 | 0.369 | 0.31 | 4.77 | 0.77 | 0.503 | 0.0174 | | 0.065 | 1.323 | 0.007 | 0.815 |
| | 26 | 0.22 | 0.340 | 1.24 | 2.25 | 0.65 | 0.683 | 0.0081 | | 0.097 | 1.575 | 0.007 | 0.828 |
| | 27 | 0.20 | 0.571 | 0.21 | 5.05 | 0.71 | 0.632 | 0.0206 | | 0.062 | 1.295 | 0.007 | 0.822 |
| | 28 | 0.18 | 0.277 | 0.16 | 5.19 | 1.43 | 0.017 | 0.1537 | | 0.060 | 1.281 | 0.004 | 0.741 |
| | 29 | 0.21 | 0.218 | 0.12 | 5.33 | 1.51 | 0.009 | 0.2102 | | 0.058 | 1.267 | 0.003 | 0.732 |
| | 30 | 0.19 | 0.249 | 0.41 | 4.49 | 0.29 | 0.350 | 0.0202 | | 0.069 | 1.351 | 0.009 | 0.869 |
| Comparative Steel | 1 | 0.39 | 1.020 | 0.46 | 5.12 | 1.19 | 0.970 | 0.0168 | | 0.061 | 1.288 | 0.005 | 0.768 |
| | 2 | 0.01 | 0.090 | 0.11 | 0.09 | 4.92 | <0.01 | 0.0011 | 18.5Ni, 9Co, 0.1Al, 0.6Ti | 0.124 | 1.791 | −0.012 | 0.351 |
| | 3 | 0.38 | 0.990 | 0.43 | 13.40 | 0.11 | 0.230 | 0.0123 | | −0.043 | 0.460 | 0.010 | 0.889 |
| | 4 | 0.36 | 0.280 | 0.71 | 1.03 | 0.19 | <0.01 | 0.0073 | | 0.112 | 1.697 | 0.009 | 0.880 |

The obtained powder was subjected to additive manufacturing to form a block-shaped mold of SKD61 (this is used as a base) by using electron beams. Thus, a mold (mold body) was manufactured. Weight of the whole mold manufactured is about 18 kg. Curved cooling circuit was provided in an additive manufacturing part, and a distance between the cooling circuit and a design surface was 15 mm Comparative Steels 1, 3 and 4 have an excessively high hardness in an additive manufacturing form, and very low toughness as they are. Therefore, the mold obtained from those steels were tempered at a temperature in a range of from 300° C. to 650° C. for 1 hour to adjust the hardness to hardness suitable for a mold.

The mold was incorporated in a die-casting machine having a clamping power of 135 tons, and a casting having a mass of 630 g was prepared with 30,000 shots as a casting test. Mold surface temperatures (maximum temperature) at 10th shot and 30,000th shot in this case were evaluated. After casting with 30,000 shots, heat check on the design surface was observed. The mold after the evaluation of heat check was cut, and the degree of corrosion and cracking of a water-cooling hole of the cooling circuit was observed. Industrial water of about 30° C. was flown through the cooling circuit in the mold.

Apart from the mold, a test piece for measurement of thermal conductivity was cut out of a small rod produced by additive manufacturing, and thermal conductivity of the test piece was measured by a laser flash method at 25° C.

The results of those evaluation tests are shown in Table 2 below.

TABLE 2

| | | Distance between water-cooling hole and design surface (mm) | HRC | Thermal conductivity (W/m/K) | Mold surface temperature (° C.) 10th Shot | Mold surface temperature (° C.) 30,000th Shot | Heat check 30,000th Shot | Cracking of water-cooling hole 30,000th Shot |
|---|---|---|---|---|---|---|---|---|
| Invention Steel | 1 | 15 | 46 | 33.4 | 398 | 404 | A | A |
| | 2 | 15 | 47 | 36.2 | 395 | 405 | A | A |
| | 3 | 15 | 46 | 29.2 | 401 | 409 | A | A |
| | 4 | 15 | 48 | 33.9 | 396 | 407 | A | A |
| | 5 | 15 | 45 | 44.0 | 389 | 408 | A | A |
| | 6 | 15 | 45 | 37.9 | 393 | 402 | A | A |
| | 7 | 15 | 44 | 43.0 | 390 | 401 | A | A |
| | 8 | 15 | 44 | 43.1 | 389 | 407 | A | A |
| | 9 | 15 | 42 | 40.8 | 391 | 400 | A | A |
| | 10 | 15 | 42 | 40.7 | 392 | 406 | A | A |
| | 11 | 15 | 46 | 38.8 | 394 | 407 | A | A |
| | 12 | 15 | 48 | 38.2 | 393 | 406 | A | A |
| | 13 | 15 | 46 | 39.2 | 392 | 408 | A | A |
| | 14 | 15 | 47 | 39.6 | 391 | 401 | A | A |
| | 15 | 15 | 47 | 38.8 | 393 | 403 | A | A |
| | 16 | 15 | 46 | 39.2 | 393 | 401 | A | A |
| | 17 | 15 | 49 | 31.2 | 397 | 403 | A | A |
| | 18 | 15 | 42 | 42.4 | 390 | 401 | A | A |
| | 19 | 15 | 46 | 34.3 | 394 | 403 | A | A |
| | 20 | 15 | 47 | 30.7 | 397 | 403 | A | A |
| | 21 | 15 | 47 | 32.3 | 396 | 406 | A | A |
| | 22 | 15 | 44 | 34.4 | 395 | 405 | A | A |
| | 23 | 15 | 41 | 38.2 | 394 | 404 | A | A |
| | 24 | 15 | 47 | 32.9 | 394 | 403 | A | A |
| | 25 | 15 | 46 | 34.1 | 395 | 404 | A | A |
| | 26 | 15 | 48 | 35.8 | 393 | 407 | A | A |
| | 27 | 15 | 47 | 30.6 | 395 | 405 | A | A |
| | 28 | 15 | 46 | 34.9 | 394 | 401 | A | A |
| | 29 | 15 | 47 | 34.7 | 395 | 401 | A | A |
| | 30 | 15 | 46 | 35.8 | 394 | 404 | A | A |
| Comparative Steel | 1 | 15 | 45 | 23.3 | 413 | 428 | B | B |
| | 2 | 15 | 36 | 19.1 | 429 | 468 | C | C |
| | 3 | 15 | 45 | 18.7 | 432 | 432 | C | A |
| | 4 | 15 | 44 | 36.9 | 394 | 424 | C | B |

As shown in Table 2, the mold obtained by additive manufacturing using each invention steel had a hardness of from 41 to 49 HRC, which is hardness suitable for a mold just as it is obtained by an additive manufacturing. The comparative steels had proper values of from 36 to 45 HRC by tempering.

Mold Surface Temperature

In the case where the surface temperature (maximum temperature) of a mold is 410° C. or lower, disadvantages (e.g., burning, poor cast structure, prolongation of cycle time, and heat check) are generally hard to occur.

According to Table 2, it is Comparative Steels 1 to 3 that are steels in which the surface temperature of the mold already reached a temperature higher than 410° C., which is not preferable, at 10th shot which is an initial stage of casting. Those comparative steels had a low thermal conductivity of 24 W/m/K or lower. Disadvantages by overheating of a mold are concerned in those comparative steels.

On the other hand, Invention Steels 1 to 30 having high thermal conductivity of 29 W/m/K or more did not exceed the mold surface temperature of 410° C. in the 10th shot. Empirically, high cooling efficiency is achieved if thermal conductivity is 28 W/m/K or more, and it is sure that overheating is suppressed in those invention steels.

Corrosion resistance greatly affects the mold surface temperature at the 30,000th shot. The reason for this is that if rust is generated in a water-cooling hole, cooling efficiency is decreased by inhibition of heat exchange by the rust and decrease of the amount of cooling water (a diameter of a water-cooling hole is decreased by the rust).

From the above standpoint, in Comparative Steels 2 and 4 having very small Cr amount, the mold surface temperature at the 30,000 shot was greatly increased as compared with that at the 10th shot, and this indicates that rust had been generated in a water-cooling hole.

In Comparative Steel 4, the mold surface temperature at the 10th shot was 394° C., but the mold surface temperature at the 30,000th shot exceeded 410° C.

On the other hand, Comparative Steel 3 has a very high Cr amount and has excellent corrosion resistance. Therefore, the mold surface temperature at the 30,000th shot did not change as compared with that at the 10th shot. However, in Comparative Steel 3, the mold surface temperature exceeded 410° C. after the 10th shot, and it is apparent that only high corrosion resistant is not sufficient for the mold surface temperature, and overheating of a mold cannot be effectively suppressed unless the mold has high thermal conductivity.

On the other hand, Invention Steels 1 to 30 attaining both high corrosion resistance and high thermal conductivity maintained a low mold surface temperature of 410° C. or lower even at the 30,000th shot.

The difference in mold surface temperature between the 10th shot and the 30,000 shot tends to be increased as the Cr amount is relatively low as in Invention Steels 5, 8 and 26, and this indicates that rust was slightly generated in a water-cooling hole. However, because of high heat conductivity and high cooling efficiency, the decrease of cooling ability by rust is not so remarkable. In order to stably maintain the temperature of a mold at low temperature, it was confirmed that high corrosion resistance and high thermal conductivity are required.

Heat Check

Heat check of a design surface of the mold after 30,000 shots was observed. The conditions that heat check is liable to be generated are the case that high-temperature strength of a mold is low (initial hardness is low and softening resistance is low) and thermal stress acted is high (thermal conductivity is low).

Comparative Steel 1 has a high high-temperature strength and relatively high thermal conductivity in the comparative steels. Therefore, heat check was moderate level. This unfavorable state was designated as "B".

Comparative Steel 2 has a low high-temperature strength (initial hardness is low) and a low thermal conductivity. Therefore, extremely heavy heat check was generated, and this state was evaluated as "C".

Comparative Steel 3 has a high high-temperature strength, but significant heat check was generated due to a low thermal conductivity, and this state was evaluated as "C" (However, this state is somewhat lighter level than the state in Comparative Steel 2).

Comparative Steel 4 has a low high-temperature strength is low. Therefore, even though a high thermal conductivity, heat check in the same level as in Comparative Steel 3 occurred, and therefore Comparative Steel 4 was evaluated as "C".

On the other hand, Invention Steels 1 to 30 achieve both a high high-temperature strength and a high thermal conductivity. Therefore heat check was very slight, and this case was evaluated as "A".

The casting test was finished with 30,000 shots this time, but heat check was less as it is thought that casting with further several ten thousand shots is possible. In order to suppress heat check, it was confirmed that high thermal conductivity is required.

Rust and Cracking of Water-Cooling Hole

The mold after casting with 30,000 shots was cut, and rust and cracking of a water-cooling hole in a water cooling circuit were confirmed.

The rust corresponded to the results of the mold surface temperature, and rust was remarkably generated in Comparative Steels 2 and 4. Rust was not substantially generated in Comparative Steel 3 which is a stainless steel, and rust was a light degree in Comparative Steel 1. Comparative Steel 1 is not a stainless steel, but has high Cr amount as about 5%, and therefore had considerable corrosion resistance.

The invention steels had the tendency that the generation of rust is less as the Cr amount is higher level.

On the other hand, the conditions that cracking of a water-cooling hole is liable to be generated are the case that corrosion resistance is low (Cr amount is small) and thermal conductivity is low (thermal stress is high).

Comparative Steel 1 has a relatively high corrosion resistance and there was a little corrosion part becoming the origin of cracks. However, cracks having a depth of about 5 mm had developed due to a low thermal conductivity, and this state was evaluated as "B". The state is not the level that penetration of cracks into a design surface immediately occurs, but the cracks are deep cracks, and this is not a preferable state.

Comparative Steel 2 has a low corrosion resistance and a low thermal conductivity, and cracks exceeding 10 mm were observed. The distance between a design surface and a water-cooling hole was 15 mm, and this state was very dangerous state that water leakage by penetration of cracks into a design surface is concerned. Needless to say, the evaluation of this state is "C".

Comparative Steel 3 has a very high corrosion resistance, and there was substantially no corrosion part becoming the origin of cracks, and cracks were not substantially observed. It is understood that although low thermal conductivity, if the generation of the origin of cracks can be suppressed, cracking of a water-cooling hole can be suppressed.

Comparative Steel 4 has a high thermal conductivity but a low corrosion resistance. Therefore, the generation of cracks cannot be suppressed, and as a result, cracks of about 5 mm had developed. Therefore, Comparative Steel 4 was evaluated as "B".

On the other hand, the steel of the present invention has the characteristics of high corrosion resistance and high thermal conductivity. Due to those characteristics, cracking of a cooling-water hole was slight, and the depth of cracks was at most about 1 mm. The evaluation of the steel of the present invention was "A". The casting test was finished with 30,000 shots this time, but cracks of the water-cooling hole were the state of small depth as it is thought that casting with further several ten thousand shots is possible.

It was confirmed from the results shown in Table 2 that it is effective to achieve both high corrosion resistance and high thermal conductivity for the improvement of cooling performance in a mold, the suppression of heat check and the reduction of cracking of a water-cooling hole.

Distance Between Water-Cooling Hole and Design Surface

Comparative Steel 3 having a high corrosion resistance has stable cooling performance that the mold surface temperature did not change between the 10th shot and the 30,000th shot. Therefore, a mold having a water-cooling hole at a position of 10 mm from a design surface was manufactured by using the steel powder of Comparative Steel 3, and the evaluation tests were conducted under the same conditions as in the casting tests shown in Table 2. Thermal stress of the design surface is reduced by the decrease of a thickness such that the water-cooling hole is brought close to the design surface. Therefore, the effect of improving heat check can be expected. The results are shown in Table 3.

exceeded 5 mm From the fact that the distance between the design surface and the water-cooling hole was 10 mm, this is very dangerous state such that water leakage by penetration of cracks into the design surface is concerned.

Thus, in the case where the water-cooling hole is brought close to the design surface for improving the cooling ability, cracking of the water-cooling hole becomes apparent.

As described above, in the case where thermal conductivity is high but corrosion resistance is poor, cooling ability is greatly deteriorated by rust. Additionally, corrosion part becomes the origin of cracks, and therefore, cracking of the water-cooling hole becomes easy to be generated. On the other hand, even though corrosion resistance is enhanced, in the case where thermal conductivity is low, cooling ability is deteriorated, and additionally, cracking of the water-cooling hole is promoted, and heat check resistance is deteriorated.

Therefore, even though only either one of thermal conductivity and corrosion resistance is enhanced, it is difficult to simultaneously attain three requirements of temperature lowering (improvement of cooling ability), suppression of heat check and reduction of the cracking of a water-cooling hole.

On the other hand, the invention steels have both high corrosion resistance and high thermal conductivity. Therefore, it is possible to simultaneously attain the three requirements.

Although Examples of the present invention is described in detail above, they are only examples. The application example to a mold (or die) for die-cast is described above, but the steel of the present invention attaining both high thermal conductivity and high corrosion resistance can be preferably applied to a mold or parts, in which a circuit through which a coolant for controlling a temperature flows is formed in the inside. Specifically, the steel of the present

TABLE 3

| | Distance between water-cooling hole and design surface (mm) | HRC | Thermal conductivity (W/m/K) | Mold surface temperature (° C.) | | Heat check | Cracking of water-cooling hole |
|---|---|---|---|---|---|---|---|
| | | | | 10th Shot | 30,000th Shot | 30,000th Shot | 30,000th Shot |
| Comparative Steel 3 | 10 | 45 | 18.7 | 397 | 397 | B | C |

As shown in Table 3, the mold surface temperature at the 10th shot was 397° C., and was low temperature similar to the invention steels shown in Table 2 (distance between a water-cooling hole and a design surface is 15 mm) A method for making the water-cooling hole close to the design surface is effective to achieve low mold surface temperature. Furthermore, the mold surface temperature maintained 397° C. even at the 30,000th shot, and cooling ability was very stable. Additionally, the heat check was improved from C of Table 2 to B as expected.

However, the cracking of the water-cooling hole was deteriorated from A of Table 2 to C. In the case where the water-cooling hole is brought close to the design surface as in this example, thermal stress of the design surface is decreased, but thermal stress of the water-cooling hole surface is increased. For this reason, it is considered that even though the corrosion parts becoming the origin of cracks are small (even though high corrosion resistance), development of cracks was accelerated. The depth of cracks invention can be applied to a mold and parts for injection molding of a resin, a rubber and the like, forging, and hot press of a steel plate, and exhibits high performance Furthermore, when the steel composed of the components of the present invention is used as a welding material in a rod shape, a line shape or a wire shape, proper hardness can be obtained as it is in a welding state as similar to in an additive manufacturing state, and the characteristics of high thermal conductivity and high corrosion resistance can be utilized. Welding is one kind of additive manufacturing. Of course, reheating for the purpose of adjusting hardness and removing strain and stress may be conducted after welding as in the ordinary welding material.

Furthermore, it is effective to combine the mold according to the steel of the present invention with surface treatment (shot blast, sand blast, nitridation, PVD, CVD, plating, etc.).

The present invention can be carried out in the embodiment having various modifications without departing the spirit and scope of the present invention.

The present application is based on Japanese Patent Application No. 2015-014809 filed on Jan. 28, 2015 and on Japanese Patent Application No. 2015-161384 filed on Aug. 18, 2015, which contents are incorporated herein by reference.

What is claimed is:

1. A steel powder having a composition consisting of, in mass %:

$0.10 \leq C < 0.25$, $0.005 \leq Si \leq 0.200$, $4.63 \leq Cr \leq 4.91$, $-0.0125 \times [Cr] + 0.125 \leq Mn \leq -0.100 \times [Cr] + 1.800$ (1)

in which the [Cr] represents the value of Cr content in mass %, $0.01 \leq Mo \leq 1.01$, $-0.00447 \times [Mo] + 0.010 \leq V \leq -0.1117 \times [Mo] + 0.901$ (2)

in which the [Mo] represents the value of Mo content in mass %, $0.0002 \leq N \leq 0.3000$, $Al \leq 1.20$;

$Cu \leq 2.00$;

$B \leq 0.0100$;

$S < 0.250$;

$Ca \leq 0.2000$;

$Se \leq 0.50$;

$Te \leq 0.100$;

$Bi \leq 0.50$;

$Pb \leq 0.50$;

$Nb \leq 0100$;

$Ta \leq 0.100$;

$Ti \leq 0.100$;

$Zr \leq 0.100$;

$W \leq 5.00$; and a balance being Fe and unavoidable impurities.

2. The steel powder according to claim 1, wherein, in mass %:

$0.10 < Al \leq 1.20$.

3. The steel powder according to claim 1, wherein, in mass %:

$0.30 < Cu \leq 2.00$.

4. The steel powder according to claim 1, wherein, in mass %:

$0.0001 < B \leq 0.0100$.

5. The steel powder according to claim 1, wherein, in mass %, at least one of following:

$0.003 < S \leq 0.250$, $0.0005 < Ca \leq 0.2000$, $0.03 < Se \leq 0.50$, $0.005 < Te \leq 0.100$, $0.01 < Bi \leq 0.50$, and $0.03 < Pb \leq 0.50$.

6. The steel powder according to claim 1, wherein, in mass %, at least one of following:

$0.004 < Nb \leq 0.100$, $0.004 < Ta \leq 0.100$, $0.004 < Ti \leq 0.100$, and $0.004 < Zr \leq 0.100$.

7. The steel powder according to claim 1, wherein, in mass %:

$0.10 < W \leq 5.00$.

8. A mold containing a site produced by an additive manufacturing method using the steel powder described in claim 1.

* * * * *